(12) United States Patent
Fransen et al.

(10) Patent No.: US 7,350,862 B2
(45) Date of Patent: Apr. 1, 2008

(54) BELT GUIDING MECHANISM AND CHILD VEHICLE SEAT

(75) Inventors: Martinus Theodorus Fransen, EN Geldrop (NL); Gert Arlën Luc Rijsdijk, BB Eindhoven (NL)

(73) Assignee: Cosco Management Inc. (CMI), Columbus, IN (US)

( * ) Notice: Subject to any disclaimer, the term of this patent is extended or adjusted under 35 U.S.C. 154(b) by 402 days.

(21) Appl. No.: 11/195,340

(22) Filed: Aug. 1, 2005

(65) Prior Publication Data
US 2006/0103229 A1 May 18, 2006

(30) Foreign Application Priority Data
Aug. 2, 2004 (NL) .................................... 1026769

(51) Int. Cl.
*B60N 2/28* (2006.01)
(52) U.S. Cl. .............................. 297/250.1; 297/216.11; 297/479; 297/480; 297/482; 297/484
(58) Field of Classification Search ........... 297/216.11, 297/250.1, 472, 476, 478–480, 482, 483
See application file for complete search history.

(56) References Cited

U.S. PATENT DOCUMENTS

| | | | | |
|---|---|---|---|---|
| 3,222,107 A | | 12/1965 | Ferrara | 297/388 |
| 3,323,831 A | * | 6/1967 | Buechler | 297/476 |
| 4,208,770 A | * | 6/1980 | Takada | 297/476 |
| 4,491,343 A | * | 1/1985 | Fohl | 297/483 |
| 4,549,770 A | * | 10/1985 | Kurtti | 297/479 |
| 4,682,791 A | | 7/1987 | Ernst | 280/806 |
| 5,031,962 A | * | 7/1991 | Lee | 297/484 |
| 5,294,183 A | * | 3/1994 | Wetter et al. | 297/472 |
| 5,658,012 A | * | 8/1997 | Villarreal et al. | 280/805 |
| 6,471,298 B2 | * | 10/2002 | Carine et al. | 297/483 |
| 6,779,843 B2 | * | 8/2004 | Kain | 297/250.1 |

FOREIGN PATENT DOCUMENTS

| | | |
|---|---|---|
| EP | 0 501 623 A1 | 9/1992 |
| EP | 1 338 485 A2 | 8/2003 |
| FR | 2 088 718 | 1/1972 |
| NL | 1011428 | 9/2000 |

* cited by examiner

*Primary Examiner*—Peter R. Brown
(74) *Attorney, Agent, or Firm*—Ladas & Parry, LLP

(57) ABSTRACT

A belt guiding mechanism, for example for a child vehicle seat, which is suitable for guiding a belt extending through the belt guiding mechanism and locking said belt against movement. The belt guiding mechanism comprises a cam that is capable of pivoting movement relative to a bearing surface, said belt being movable in a tensioning direction and in the opposite direction through a passage present between said cam and said bearing surface. The cam is pivotable in a direction towards the hearing surface for locking the belt against movement. The cam is connected to a sleeve that can be positioned against a person's shoulder, in which sleeve the belt is slidably accommodated.

21 Claims, 7 Drawing Sheets

BELT GUIDING MECHANISM AND CHILD VEHICLE SEAT

The invention relates to a belt guiding mechanism suitable for guiding a belt extending through the belt guiding mechanism and locking said belt against movement, which belt guiding mechanism comprises a cam that is capable of movement relative to a bearing surface, said belt being movable in a tensioning direction and in the opposite direction through a passage present between said cam and said bearing surface, which cam is movable In a direction towards the bearing surface for locking the belt against movement.

The invention also relates to a child vehicle seat provided with such a belt guiding mechanism.

With such a belt guiding mechanism as known from European patent EP-B1-0 173 726, which is used in a vehicle, the belt is movable in the tensioning direction for tensioning the belt firmly against a person seated in the vehicle. The belt is movable in the opposite direction of the tensioning direction so as to allow slight forward movement of said person.

If said forward movement is caused by the vehicle suddenly decelerating or colliding, relatively large forces are exerted on the person and consequently by the person on the belt, as a result of which the cam is moved in a direction towards the bearing surface. This causes the belt to be clamped down between the cam and the bearing surface, so that the belt is locked against movement in the opposite direction of the tensioning direction.

In case of such a collision, one end of the belt is furthermore locked against movement in the opposite direction of the tensioning direction in an automatic belt retractor.

A drawback of the known belt guiding mechanism is the fact that said locking of the belt is effected both as a result of the operation of the automatic belt retractor and as a result of the belt being locked against movement between the cam and the bearing surface. The belt that moves through the belt guiding mechanism is relatively smooth so that the belt can readily be rolled up in the automatic belt retractor. A drawback of such a relatively smooth belt is that the belt will fairly easily slide off the shoulder of a person seated in the vehicle, for example. In case of a collision, a person's shoulder will first move relative to the belt before the belt is moved in the opposite direction of the tensioning direction and locking of the belt can take place.

The object of the invention is to provide a belt guiding mechanism wherein locking of the belt against movement in the opposite direction of the tensioning direction can take place relatively quickly.

This object is accomplished with the belt guiding mechanism according to the invention in that the cam is connected to a sleeve that can be positioned against a person's shoulder, in which sleeve the belt is slidably accommodated.

As soon as a force that exceeds a predetermined force is exerted on the sleeve in the opposite direction of the tensioning direction, the sleeve will be moved in the opposite direction of the tensioning direction, with the cam being moved towards the bearing surface, causing the belt to be clamped down and locked against movement between the cam and the bearing surface.

In use, the sleeve rests on the shoulder of a person seated in the vehicle, said sleeve being made of a relatively rough material, so that it will have a relatively high coefficient of friction with a usual garment of a person.

Since the belt is slidably accommodated within the sleeve, the belt can be readily moved in the tensioning direction and in the opposite direction in the position in which the cam is clear of the bearing surface.

One embodiment of the belt guiding mechanism according to the invention is characterized in that a liner having a higher coefficient of friction than the belt is present on an outer side of the sleeve remote from the belt.

The use of such a liner having a relatively high coefficient of friction with a user's garment prevents the sleeve from a sliding off a person's shoulder. As soon as said person moves forward, for example in case of a collision, the relatively high coefficient of friction will directly result in the sleeve being moved as well and the belt being locked against movement.

Another embodiment of the belt guiding mechanism according to the invention is characterized in that a liner having a relatively low coefficient of friction with the belt is present on an inner side of the sleeve facing towards the belt.

In this way it is relatively easy to move the belt in the tensioning direction and in the opposite direction relative to the sleeve.

Another embodiment of the belt guiding mechanism according to the invention is characterized in that the cam is connected to the sleeve via a strap, which strap is connected to the cam between a pivot pin of the cam and the bearing surface.

The strap makes it possible to realise a connection between the cam and the sleeve in a simple manner. Since the belt engages between the pivot pin about which the cam pivots and the bearing surface, pivoting of the cam towards the bearing surface is effected in a simple manner upon movement of the strap in the opposite direction of the tensioning direction.

The invention also relates to a child vehicle seat comprising a seat portion, a back support and at least one shoulder belt extending through said back support.

The child vehicle seat according to the invention is characterized in that the child vehicle seat comprises a belt guiding mechanism comprising a cam that is capable of movement relative to a bearing surface, said shoulder belt being movable in a tensioning direction and in the opposite direction through a passage present between said cam and said bearing surface, which cam is movable in a direction towards the bearing surface for locking the shoulder belt against movement, said cam being connected to a sleeve that is present on a side of the back support that faces towards the seat portion, said shoulder belt being slidably accommodated within said sleeve.

Such a child vehicle seat is mounted in a vehicle by means that are known per se, after which a child can be secured in the child vehicle seat by means of belts. When the child undergoes a relatively rapid acceleration relative to the child vehicle seat, for example in case of a collision, the sleeve that abuts against the child's shoulder is moved in the opposite direction of the tensioning direction, as a result of which the cam is moved towards the bearing surface and the shoulder belt is clamped down and locked against movement between the cam and the bearing surface.

One embodiment of the child vehicle seat according to the invention is characterized in that the cam is provided with teeth on a side that faces towards the bearing surface.

The teeth ensure that a firm engagement is effected between the cam and the belt, so that the belt is effectively locked against movement.

Another embodiment of the child vehicle seat according to the invention is characterized in that the cam is capable of pivoting movement against spring force in a direction towards the bearing surface.

In this way the cam will preferably be pivoted away from the bearing surface, so that the belt can easily move through the passage present between the cam and the bearing surface.

Yet another embodiment of the child vehicle seat according to the invention is characterized in that the cam is capable of pivoting movement in a direction away from the bearing surface upon movement of the belt in the tensioning direction.

Since the cam is pivoted away from the bearing surface, the passage is enlarged, as a result of which the belt can easily move in the tensioning direction.

Yet another embodiment of the child vehicle seat according to the invention is characterized in that the cam can be locked in a clearance position in which the shoulder belt can freely move in a tensioning direction and in the opposite direction through the passage between the cam and the bearing surface.

In this way it is possible to lock the cam against movement, for example with comparatively small children, so that the belt will not be clamped down and the parts of the extension portion can be moved apart under the influence of a force being exerted thereon.

When a comparatively large child is transported, the cam will be moved towards the bearing surface relatively quickly, causing the shoulder belt to be clamped down between the cam and the bearing surface. Parts of the extension portion will not be moved apart in that case.

Yet another embodiment of the child vehicle seat according to the invention is characterized in that the shoulder belt comprises at least one extension portion comprising at least two opposing parts of the shoulder belt, which can be moved apart under the influence of a force being exerted thereon.

With comparatively large children, movement of the child relative to the shoulder belt must be limited as much as possible so as to prevent the risk of the child coming into contact with, for example, the front seat of the vehicle positioned in front of the child vehicle seat. The child is subjected to relatively large deceleration forces in that case.

It has become apparent that such relatively large deceleration forces are disadvantageous when comparatively small children are being transported.

When the child is placed into the child vehicle seat, and the shoulder belt is tensioned by means that are known per se, the two parts of the extension portion remain positioned opposite each other. When large forces are exerted on the child, however, and thus on the shoulder belts extending across the child's shoulders, in case of a collision, the two parts will be moved apart, causing the length of the shoulder belt to increase. As a result, the child can move further forward relative to the back support as the shoulder belt is further extended. The deceleration of the child now takes place more slowly than in the situation in which the extension portion is not used. The fact that the child is moved relatively closer to an object positioned in front of the child vehicle seat, for example a vehicle seat positioned in front thereof, is less relevant in the case of a comparatively small child and the risk involved is relatively low. On the other hand, the fact that the child is decelerated more slowly as a result of the extension portion being extended significantly reduces the risk of injury to the comparatively small child. The risk of the child coming into contact with another object in the vehicle is only increased to a comparatively small degree.

One embodiment of the child vehicle seat according to the invention is characterized in that the extension portion is present on a side of the back support remote from the seat portion.

In this way the extension portion is hidden from view to the user, so that it will not mar the appearance of the child vehicle seat.

Another embodiment of the child vehicle seat according to the invention is characterized in that the parts are interconnected by a stitched seam, which connection can be broken under the influence of a force being exerted thereon.

An extension portion can be created in a comparatively simple manner by means of a simple stitched seam, in which two parts are folded against each other about a folding seam, as it were, to be interconnected by means of a stitched seam on a side remote from the folding seam. When a relatively large force is exerted on the shoulder belt, the stitched seam will come loose, after which the two parts can be moved apart to be positioned in line with each other.

Another embodiment of the child vehicle seat according to the invention is characterized in that the parts abut against each other, being interconnected over a stitched area, which connection can be broken under the influence of a force being exerted thereon.

Since the parts are interconnected over an entire stitched area, the parts will be gradually moved apart along said stitched area when a relatively large collision force occurs, so that a gradual extension of the shoulder belt is obtained.

Yet another embodiment of the child vehicle seat according to the invention is characterized in that the parts are interconnected by means of a spring element.

Said spring element will be extended when a relatively large collision force occurs, as a result of which the two parts of the extension portion can be moved apart. Once the collision has ended and the collision force is no longer being exerted, the parts can be moved together again under the influence of the action of the spring element.

It is also possible to arrange for the parts of the extension portion not to be moved apart until a predetermined force is exerted, and for the cam to be moved towards the bearing surface to clamp down the belt when a force larger than said predetermined force is being exerted.

The invention will now be explained in more detail with reference to the drawings, in which.

Like parts are indicated by the same numerals in the figures.

Figure 1:
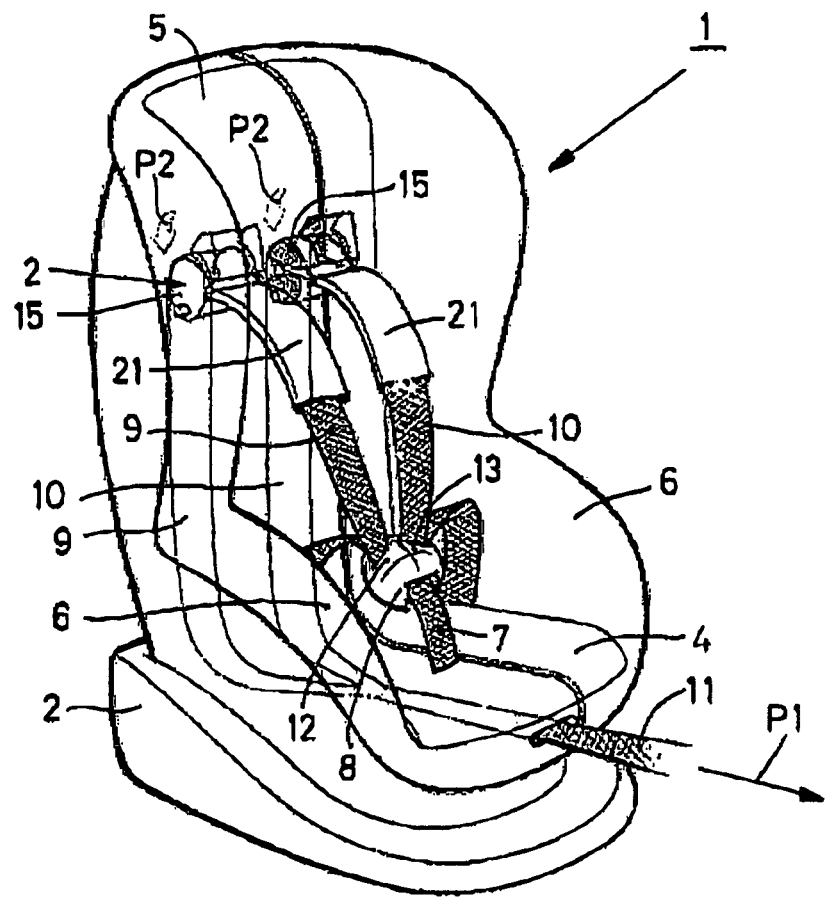
FIG. 1 is a perspective view of a child vehicle seat according to the invention, which comprises a belt guiding mechanism according to the invention, in which the belts are freely movable.

FIG. 1 shows a child vehicle seat 1 according to the invention, which comprises a chassis 2 and a seat 3 that is tiltably connected to the chassis 2. The seat 3 comprises a seat portion 4 and a back support 5 connected thereto. The seat portion 4 is bounded by armrests 6 on both longitudinal sides. The child vehicle seat 1 comprises a crotch member portion 7, which is connected to the seat portion 4 with one end and which is provided with a buckle lock 8 on a side remote from the seat portion 4. The child vehicle seat 1 further comprises two belts 9, 10, which are each connected to the seat 3 with one end at the location of a transition between the seat portion 4 and the armrests 6. The ends of the belts 9, 10 may also be interconnected under the seat portion 4. The ends of the belts 9, 10 remote from the seat portion extend through the back support 5 and are connected to a tensioning belt 11 on the rear side of the back support 5. The tensioning belt 11 is movable in the direction indicated by the arrow P1 for tensioning the belts 9, 10. Belt buckles 12, 13 can slide over the belts 9, 10, which belt buckles 12, 13 are each provided with a buckle tongue, which can be interlocked with the buckle lock 8. The lower portions of the belts 9, 10 form lap belts, whilst the upper portions form shoulder belts.

The back support 5 is provided with a number of openings 26, 27 positioned one above another, through which the belts 9, 10 are passed, the opening 26, 27 in question being selected in dependence on the size of the child to be transported in the child vehicle seat.

The child vehicle seat as described so far is known per se and will not be explained in more detail herein, therefore.

On a side of the back support 5 remote from the seat portion 4, the child vehicle seat 1 according to the invention is provided with two cams 15 that pivot about pivot pins 14, which each comprise a portion provided with projecting teeth 16 that is positioned opposite a bearing surface 17 that is rigidly connected to the back support 5. Present between the cam 15 and the bearing surfaces 17 is a passage 18, through which the belts 9 and 10 extend. Each cam 15 is connected to a strap 19 between the pivot pin 14 and the portion that is provided with teeth 16. On a side remote from the back support 5, the strap 19 is connected to the cam 15 by means of a locking element 20. The strap 19 extends through the back support 5 to a side facing towards the seat portion and is connected to a sleeve 21 with an end remote from the cam 15. The belt 9, 10 extends through the sleeve 21. On an inner side facing toward the belt 9, 10, the sleeve 21 is provided with a liner that has a relatively low coefficient of friction with the belt 9, 10. On an outer side remote from the belts 9, 10, the sleeve 21 is provided with a liner of 22 that has a relatively high coefficient of friction with a garment of a child seated in the child vehicle seat 1.

The operation of the child vehicle seat 1 according to the invention is as follows. Once a child is seated in the child vehicle seat 1 and the buckle tongues of the belt buckles 12, 13 are connected to the buckle lock 8, the tensioning belt 11 is moved in the direction indicated by the arrow P1, as a result of which the belts 9, 10 connected thereto are pulled against the child and tensioned. The belt 9, 10 moving over the cam 15 causes the cam 15 to pivot in the direction indicated by the arrow P2, as a result of which the portion provided with teeth 16 is moved away from the bearing surfaces 17 and the passage 18 is enlarged. As a result, the belt 9, 10 can move through the passage 18 relatively easily. The teeth 16 preferably extend in a direction away from the sleeve 21, so that the teeth 16 do not interfere with the movement of the belt 9, 10 in the tensioning direction indicated by the arrow P1.

Figure 3:
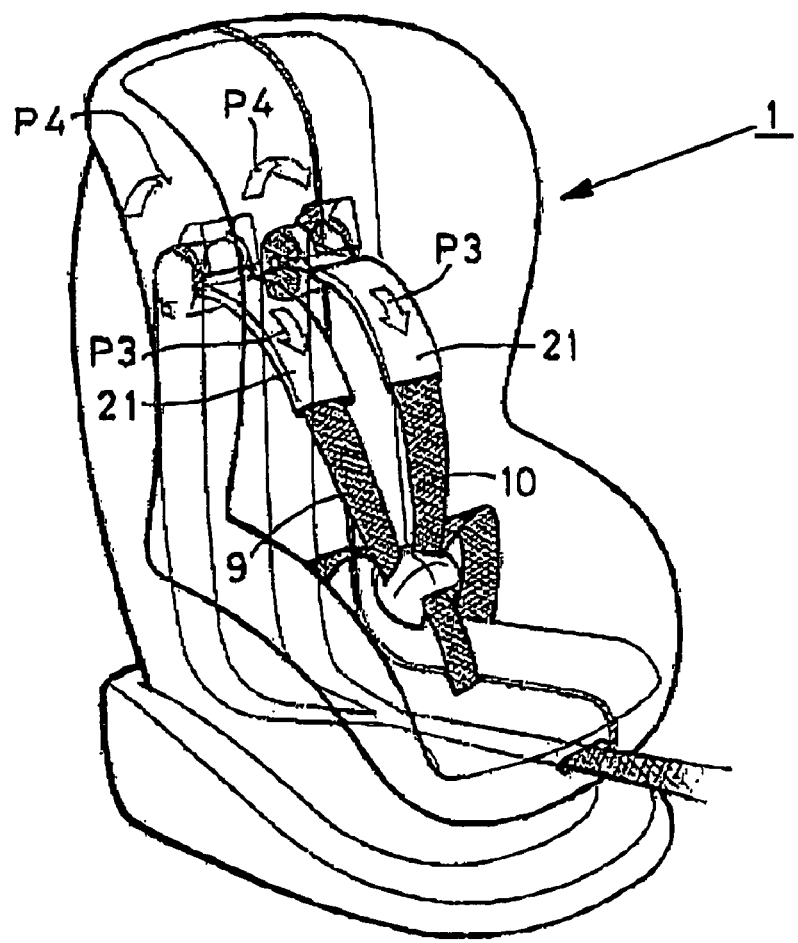
FIG. 3 is a perspective view of the child vehicle seat of FIG. 1, in which the belts are locked against movement.
Figure 4:
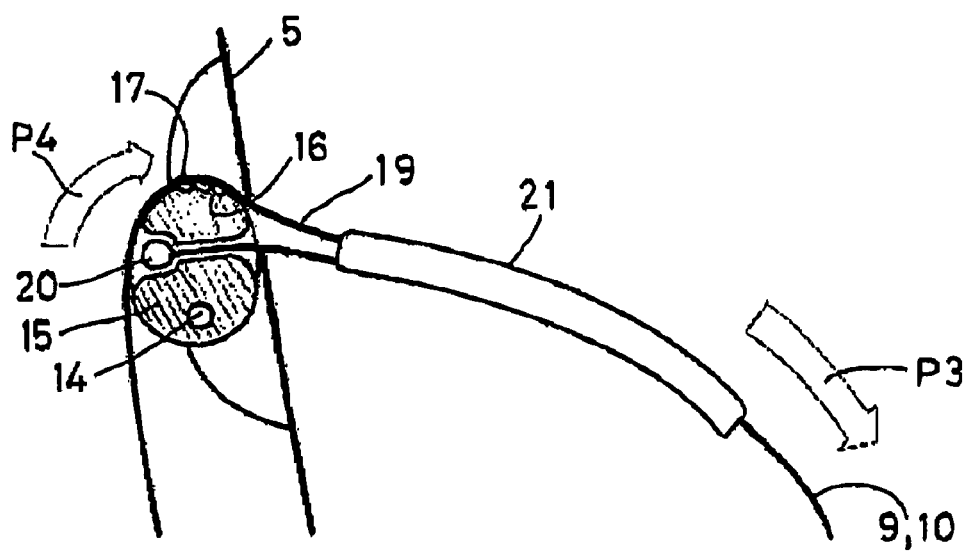
FIG. 4 is a detail view of the child vehicle seat that is shown in FIG. 3.

The sleeves 21 abut against the child's shoulders with the liners 22. When the child moves away from the back support 5, the relatively high coefficient of friction will result in a relatively large frictional force between the sleeve 21 and the child's shoulders. When said frictional force is sufficiently large, the sleeve 21 will be moved in the direction indicated by the arrow P4, causing the cam 15 to pivot In a direction P3 opposed to the direction indicated by the arrow P2 (FIGS. 3, 4). The portion provided with teeth 16 is moved toward the bearing surface 17, and the belt 9, 10 positioned therebetween is clamped down between the cam 15 and the bearing surface 17 and locked against movement in the direction indicated by the arrow P4.

Figure 2:
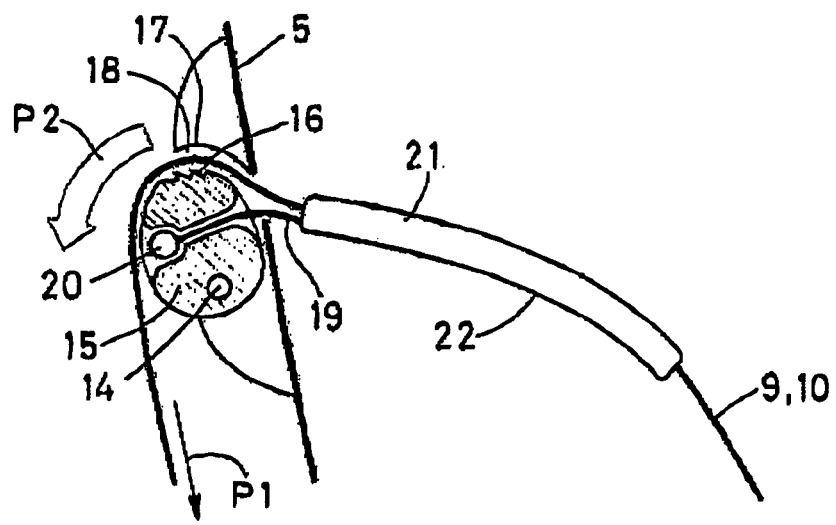
FIG. 2 is a detail view of the child vehicle seat that is shown in FIG. 1.

Preferably, the cam 15 is provided with a spring, and preferably the spring force generated by the spring causes the cam 15 to take up the clearance position spaced from the bearing surface 17, as is shown in FIG. 2. Consequently, the spring force generated by the spring will have to be overcome first in order to move the cam 15 in the direction indicated by the arrow P3 to the locking position that is shown in FIG. 4.

Figure 5:
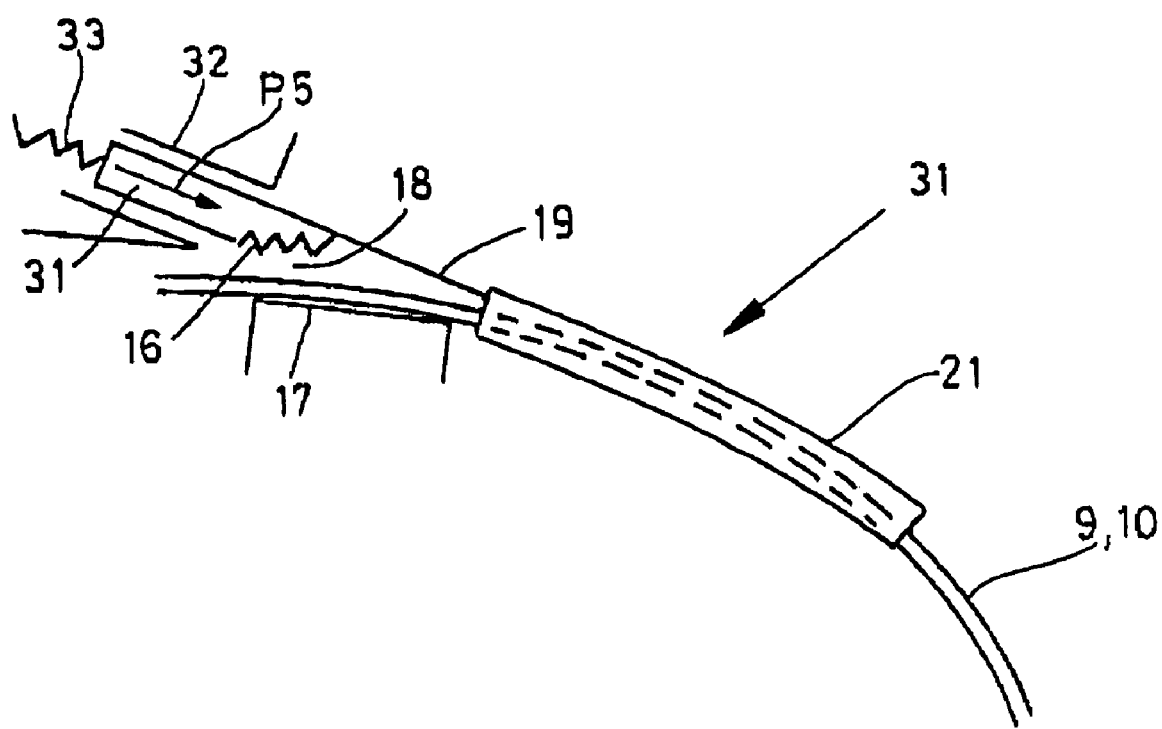
FIG. 5 is a side view of another embodiment of a belt guiding mechanism according to the invention.

FIG. 5 is a side view of another embodiment of a belt guiding mechanism according to the invention. The belt guiding mechanism 31 comprises a cam 32 provided with teeth 16, which is slidably supported in a guide 32. The cam 31 is connected, via a strap 19, to a sleeve 21 through which a belt 9, 10 extends. A bearing surface 17 is located on a side of the belt 9, 10 remote from the strap 19. The cam 31 can move in the direction indicated by the arrow P5, towards the supporting surface 17, against the spring force of a spring 33, thereby reducing the size of the passage 18 and causing the belt 9, 10 to be clamped down and be locked against movement between the teeth 16 of the cam 31 and the bearing surface 17.

Figure 6:
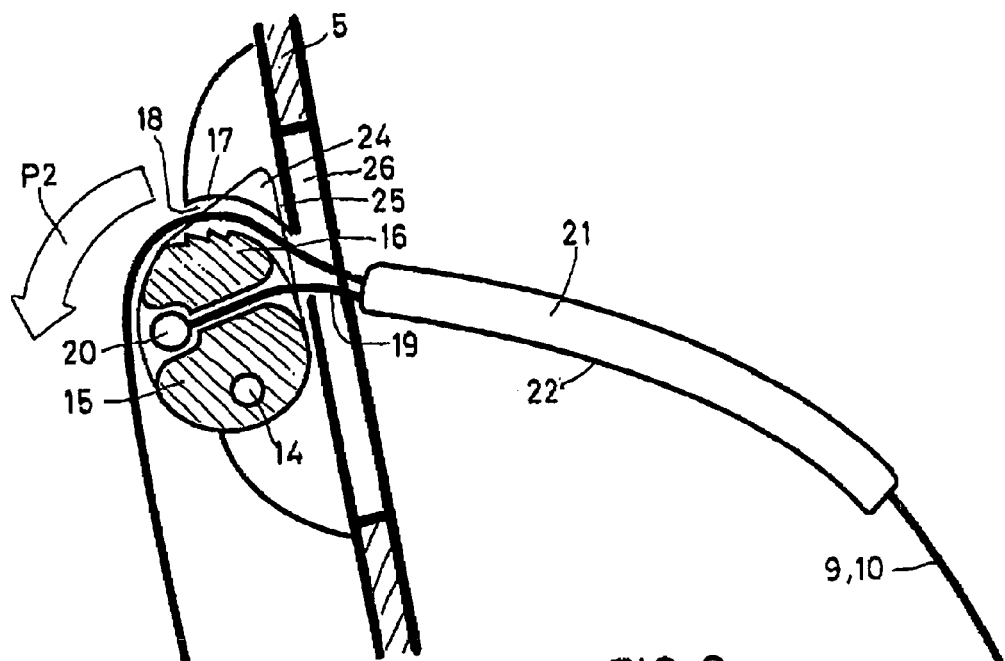
FIG. 6 is a detail view of another embodiment of a belt guiding mechanism according to the invention, in which the belts are freely movable.
Figure 7:
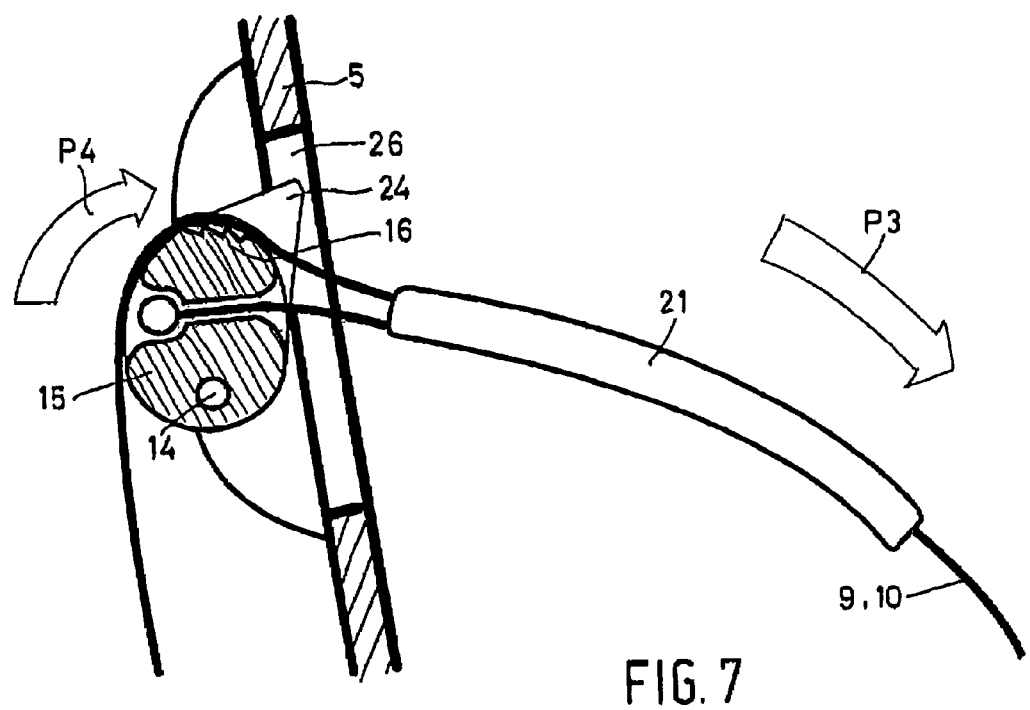
FIG. 7 is a detail view of said other embodiment of the belt guiding mechanism according to the invention, in which the belts are locked against movement.
Figure 8:
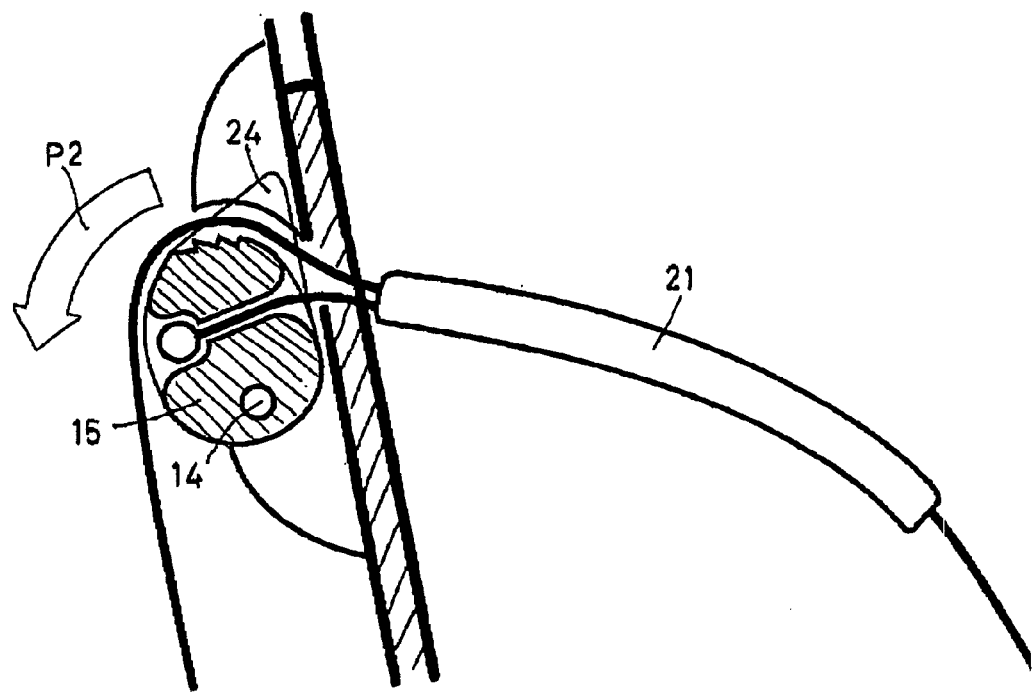
FIG. 8 is a detail view corresponding to FIG. 6 of the belt guiding mechanism, in which the cam is locked in position.
Figure 9:
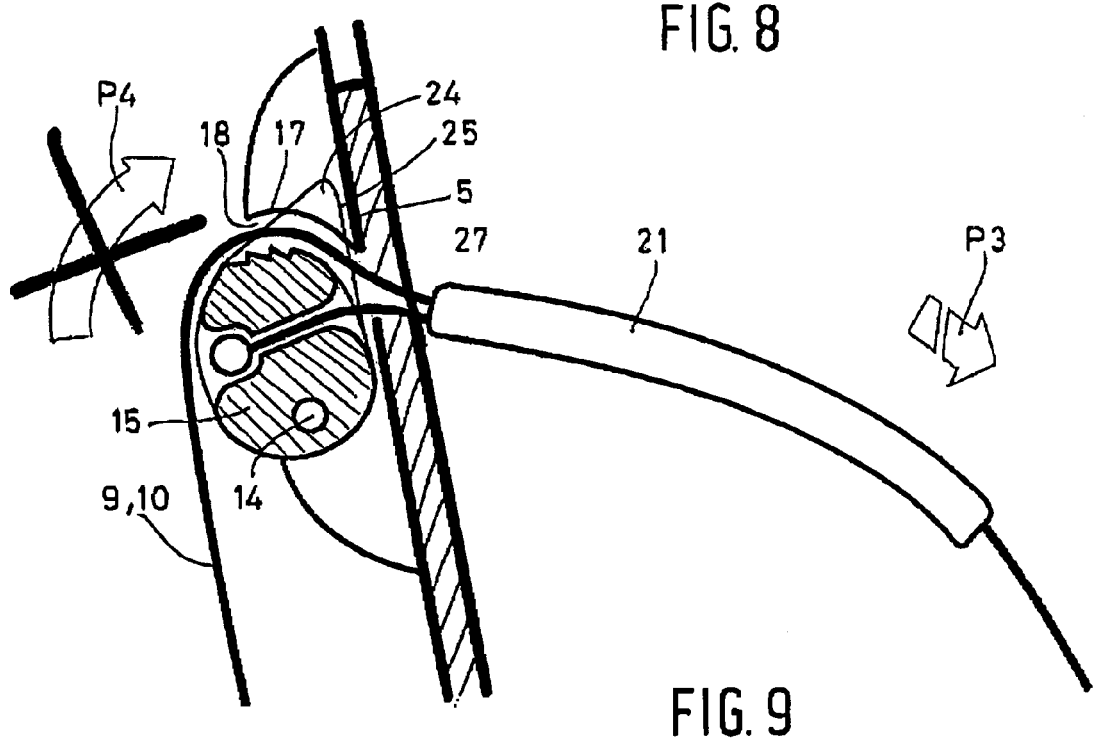
FIG. 9 is a detail view corresponding to FIG. 8 of the belt guiding mechanism during a collision.

In the embodiment of a belt guiding mechanism according to the invention that is shown in FIGS. 6-9, the cam 15 is connected to a cam 24, which extends beyond the bearing surface 17 and which extends parallel to the back support 5 with a side 25 in the position that is shown in FIG. 6. In the position that is shown in FIGS. 6 and 7, the cam 24 is positioned opposite a relatively large passage 26 in the back support 5. In the position that is shown in FIGS. 8 and 9, further down the back support 5, the passage 27 is comparatively small and the side 25 of the cam 24 abuts against the back support 5.

When the shoulder belts 9, 10 extend through the relatively high positioned, relatively large passages 26, the operation of the child vehicle seat 1 according to the invention is as follows. When the child moves away from the back support 5, a relatively large frictional force will occur between the sleeve 21 and the child's shoulders as a result of the relatively high coefficient of friction. If said frictional force is sufficiently large, the sleeve 21 will be moved in the direction indicated by the arrow P4, causing the cam 15 as well as the cam 24 to be pivoted in the direction indicated by the arrow P3, opposite to the direction indicated by the arrow P2 (FIG. 7). The cam 24 extends into the relatively large passage 26 in that position. The portion provided with teeth 16 is moved towards the bearing surface 17 and the belt 9, 10 positioned therebetween is clamped down and locked against movement in the direction indicated by the arrow P4 between the cam 15 and the bearing surface 17.

When the shoulder belts 9, 10 extend through the relatively low positioned, relatively small passages 27 (FIGS. 8, 9), friction will occur between the sleeve 21 and the child's shoulders, to be true, but the cam 24 cannot pivot in the direction indicated by the arrow P4, because the side 25 of the cam will abut against the back support 5, as a result of which the cam 24 and also the cam 15 connected thereto are locked against pivoting movement. This enables the belts to move freely through the passage 18, the passage 27 in the back support and the sleeve 21 (FIG. 9).

Figures 10A, 10B:
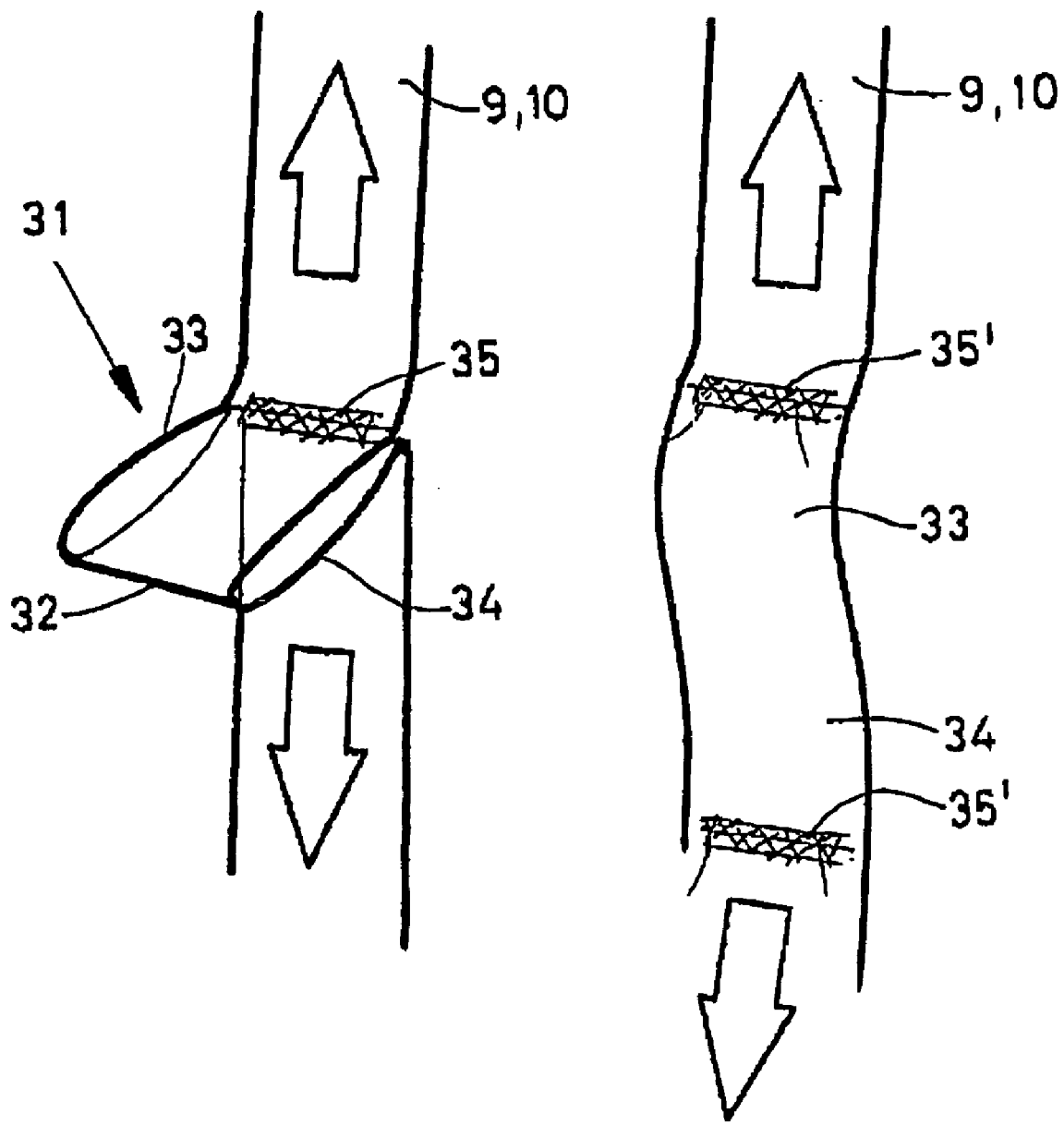
FIGS. 10A and 10B show an extension portion of the child vehicle seat according to the invention in a starting position and an extended position, respectively.
Figure 11A:
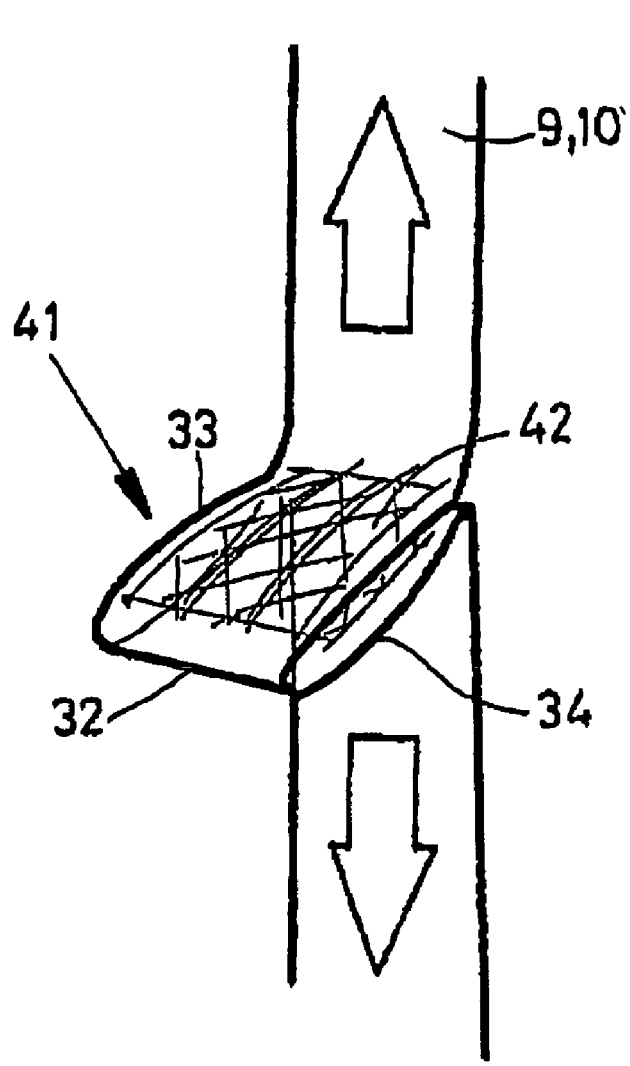
FIGS. 11A and 11B show another embodiment of an extension portion of a child vehicle seat according to the invention in a starting position and an extended position, respectively.
Figure 11B:
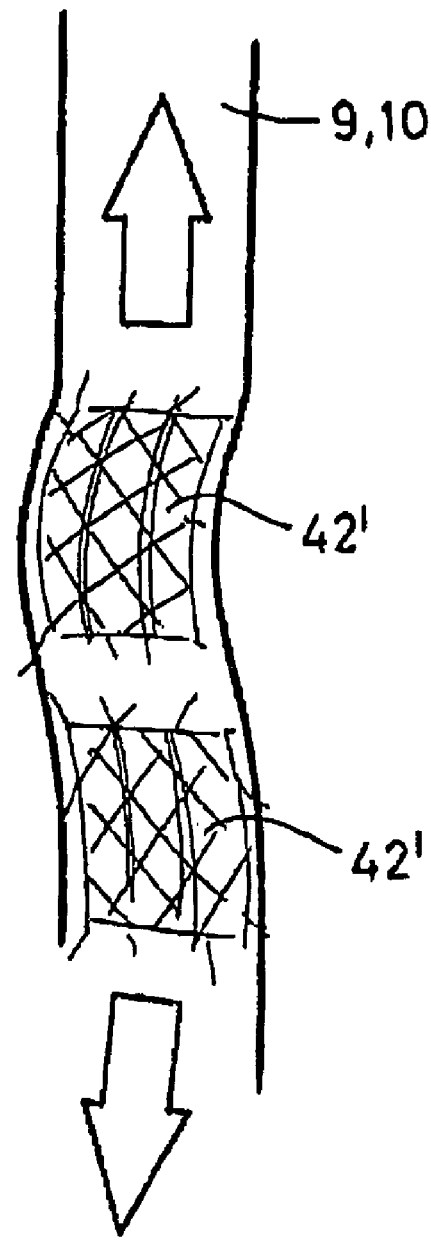

The belts 9, 10 may be provided with an extension portion 31 (FIGS. 10A, 10D) or an extension portion 41 (FIG. 11A, 11B) on a side of the back support 5 remote from the seat portion.

The extension portion 31 has been formed in the belt 9, 10 by folding the belt 9, 10 double about a folding seam 32, with two belt portions 33, 34 being positioned opposite each other. On a side remote from the folding seam 32, the belt portions 33. 34 are interconnected by means of a stitched seam 35. As long as a relatively small force is exerted on the belt 9, 10, for example by tensioning the belt 9, 10 or upon movement of the child in the child vehicle seat, the stitched seam 35 is strong enough not to be broken. However, as soon as a relatively large force is exerted on the child, and consequently on the belts 9, 10, in the direction indicated by the arrow P3 in case of a collision in the position that is shown in FIG. 9, the stitched seam 35 will come loose, causing the belt portions 33, 34 to be positioned in line with the belt 9, 10, as a result of which the effective belt length is increased and the child can move further in the direction indicated by the arrow P3. As a result, the child will be decelerated more slowly in case of a collision, and it has been found that this reduces the risk of injury to the child. The distance between the broken stitched seams 35' is preferably not too long, so as to prevent the child from abruptly moving too far away from the back support after the stitched seam 35 has come loose.

Such abrupt movement can be prevented if the portions 33, 34 are not interconnected by a stitched seam 35, as is the case with the extension portion 41, but over a stitched area 42. The stitching in the stitched area 42 will gradually come loose when a comparatively large force is exerted on the belts 9, 10, as a result of which a gradual, controlled extension of the belts 9, 10 will take place.

It is also possible to provide the belts 9, 10 with a number of extension portions. In that case it is possible to use the same type of stitched seam 35 over the stitched area 42 for each extension portion, or to configure the stitched seams such that different forces are required for moving the portions 33, 34 apart at the various extension portions.

It is also possible to interconnect the portions 33, 34 by means of a spring element on a side remote from the folding seam 32, which spring element can undergo an extension under the influence of a relatively large force being exerted thereon.

Of course it is also possible to use the belt 9, 10 provided with the extension portion without a cam 15 being present, in which case the belt can undergo an extension both when transporting comparatively large children and when transporting comparatively small children.

Preferably, the sleeve 21 is provided with a relatively smooth material on the inside, as a result of which the coefficient of friction with the belt 9, 10 moving through the sleeve 21 is relatively low.

On an outer side 22 remote from the belt 9, 10, the sleeve 21 is preferably provided with a material having a relatively high coefficient of friction with a garment worn by a child, for example a thermoplastic elastomer, a textured material or a material provided with friction studs.

It is also possible to use the belt guiding mechanism with a vehicle safety belt, in which case the cam 15 is positioned in the frame of the vehicle and the sleeve 21 is located on a side of a back support that faces towards a seat portion.

It is also possible to use only a single cam at the rear side of the back support, which cam will be capable of locking both shoulder belts against movement at the same time.

It is also possible to use the belt guiding mechanism according to the invention with the lap belts 9, 10.

The cam may have any shape suitable for clamping down a belt.

The invention claimed is:

1. A belt guiding mechanism suitable for guiding a belt extending through the belt guiding mechanism and locking said belt against movement, which belt guiding mechanism comprises a cam that is capable of movement relative to a bearing surface, said belt being movable in a tensioning direction and in the opposite direction through a passage present between said cam and said bearing surface, which cam is movable in a direction towards the bearing surface for locking the belt against movement, characterized in that the cam is connected to a sleeve that can be positioned against a person's shoulder, in which sleeve the belt is slidably accommodated.

2. A belt guiding mechanism according to claim 1, characterized in that a liner having a higher coefficient of friction than the belt is present on an outer side of the sleeve remote from the belt.

3. A belt guiding mechanism according to claim 1, characterized in that a liner having a relatively low coefficient of friction with the belt is present on an inner side of the sleeve facing towards the belt.

4. A belt guiding mechanism according to claim 1, characterized in that the cam can pivot about a pivot pin.

5. A belt guiding mechanism according to claim 4, characterized in that the cam is connected to the sleeve via a strap, which strap is connected to the cam between a pivot pin of the cam and the bearing surface.

6. A belt guiding mechanism according to claim 1, characterized in that the cam is capable of sliding movement against spring force in a direction towards the bearing surface.

7. A child vehicle seat comprising a seat portion, a back support and at least one shoulder belt extending through said back support, characterized in that the child vehicle seat comprises a belt guiding mechanism comprising a cam that is capable of movement relative to a bearing surface, said belt being movable in a tensioning direction and in the apposite direction through a passage present between said cam and said bearing surface, which cam is movable in a direction towards the bearing surface for locking the belt against movement, said cam being connected to a sleeve that is present on a side of the back support that faces towards the seat portion, said shoulder belt being slidably accommodated within said sleeve.

8. A child vehicle seat according to claim 7, characterized in that a liner having a higher coefficient of friction than the belt is present on an outer side of the sleeve remote from the belt.

9. A child vehicle seat according to claim 7, characterized in that a liner having a relatively low coefficient of friction with the belt is present on an inner side of the sleeve facing towards the belt.

10. A child vehicle seat according to claim 7, characterized in that the cam is provided with teeth on a side that faces towards the bearing surface.

11. A child vehicle seat according to claim 7, characterized in that the cam is connected to the sleeve via a strap, which strap is connected to the cam between a pivot pin of the cam and the bearing surface.

12. A child vehicle seat according to claim 7, characterized in that the cam is capable of pivoting movement against spring force in a direction towards the bearing surface.

13. A child vehicle seat according to claim 7, characterized in that the cam is capable of pivoting movement in a direction away from the bearing surface upon movement of the belt in the tensioning direction.

14. A child vehicle seat according to claim 7, characterized in that the cam is capable of sliding movement against spring force in a direction towards the bearing surface.

15. A child vehicle seat according to claim 7, characterized in that the cam can be locked in a clearance position in which the shoulder belt can freely move in a tensioning direction and in the opposite direction through the passage between the cam and the bearing surface.

16. The child vehicle seat according to claim 15, characterized in that the back support is provided with at least two passages, wherein the cam can be moved to a locking position for locking the shoulder belt against movement at the first passage, whilst the cam can be locked in the clearance position at the other passage.

17. A child vehicle seat according to claim 7, characterized in that the shoulder belt comprises at least one extension portion comprising at least two opposing parts of the shoulder belt, which can be moved apart under the influence of a force being exerted thereon.

18. A child vehicle seat according to claim 17, characterized in that the extension portion is present on a side of the back support remote from the seat portion.

19. A child vehicle seat according to claim 17, characterized in that the parts are interconnected by a stitched seam, which connection can be broken under the influence of a force being exerted thereon.

20. A child vehicle seat according to claim 17, characterized in that the parts abut against each other, being interconnected over a stitched area, which connection can be broken under the influence of a force being exerted thereon.

21. A child vehicle seat according to claim 17, characterized in that said parts are interconnected by means of a spring element.

* * * * *